US009645973B2

(12) United States Patent
Ono

(10) Patent No.: US 9,645,973 B2
(45) Date of Patent: May 9, 2017

(54) MATRIX CALCULATION APPARATUS, MATRIX CALCULATION METHOD, AND COMPUTER READABLE MEDIUM HAVING MATRIX CALCULATION PROCESS PROGRAM STORED THEREON

(71) Applicant: CASIO COMPUTER CO., LTD., Shibuya-ku, Tokyo (JP)

(72) Inventor: Manato Ono, Wako (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 472 days.

(21) Appl. No.: 14/220,054

(22) Filed: Mar. 19, 2014

(65) Prior Publication Data

US 2014/0289301 A1    Sep. 25, 2014

(30) Foreign Application Priority Data

Mar. 21, 2013  (JP) .................................. 2013-058983

(51) Int. Cl.
| | | |
|---|---|---|
| *G06F 17/16* | (2006.01) | |
| *G06F 15/02* | (2006.01) | |
| *G09B 19/02* | (2006.01) | |

(52) U.S. Cl.
CPC ............ *G06F 17/16* (2013.01); *G06F 15/025* (2013.01); *G06F 15/0225* (2013.01); *G09B 19/025* (2013.01)

(58) Field of Classification Search
CPC ..... G06F 15/0225; G06F 15/025; G06F 17/16
USPC .......................... 708/130, 131, 141, 160, 170
See application file for complete search history.

(56) References Cited

U.S. PATENT DOCUMENTS

| 5,442,743 A | 8/1995 | Kuno | |
|---|---|---|---|
| 5,771,392 A * | 6/1998 | Razdow | .................. G06F 17/16 |
| | | | 708/607 |
| 2013/0262550 A1* | 10/2013 | Ono | ........................ G09B 5/02 |
| | | | 708/607 |

FOREIGN PATENT DOCUMENTS

| EP | 2645268 A1 | 10/2013 |
|---|---|---|
| JP | 05-012215 A | 1/1993 |
| JP | 2007287185 A | 11/2007 |

OTHER PUBLICATIONS

Mathsoft Inc., "Mathcad User's Guide: Mathcad 2000 Professional/Mathcad 2000 Standard", Aug. 1999.*

(Continued)

*Primary Examiner* — Matthew Sandifer
(74) *Attorney, Agent, or Firm* — Holtz, Holtz & Volek PC

(57) ABSTRACT

There is provided a matrix calculation apparatus. The apparatus includes: a matrix calculation formula display controller configured to display a matrix calculation formula on a display unit, wherein the matrix calculation formula comprises a first matrix; a matrix display controller configured to display a second matrix on the display unit; a submatrix receiver configured to input the second matrix into a certain element of the first matrix as a submatrix of the first matrix in response to a user operation; and a matrix size change display controller configured to change a size of the first matrix in accordance with a size of the second matrix and the certain element of the first matrix into which the second matrix is input and then display the matrix calculation formula.

8 Claims, 9 Drawing Sheets

(56) References Cited

OTHER PUBLICATIONS

PTC Mathcad Prime 3.1 Help Center, "To Collapse or Expand Nested Matrices", retrieved from http://help.ptc.com/mathcad/en/index.html#page/Mathcad/Mprime/to_collapse_expand_nested_matrices.html, Jul. 2016.*
"Casio Classpad Help Series, Version 7"; Australian Casio Education Internet site; Mar. 2011; XP055125580; URL: http://classpad.com.au/pdf/CP000_Classpad_Help_Series.pdf; pp. 164-165.
"Maple User Manual"; Maplesoft; 2012; XP55125667; URL: http://www.maplesoft.com/view.aspx?SF=131922/432650/UserManual.pdf; pp. 86-88: section 3.4, "Palettes"; pp. 156-158: "Creating matrices"; pp. 166-167; p. 285: "Copy and Paste".
Aitken A C: "Determinants and Matrices, Third Edition"; 1944; Oliver and Boyd, Edinburgh and London, XP055073599; Section 11: "Partitioned Matrices and Multiplication"; pp. 21-27.
Extended European Search Report dated Jul. 9, 2014 in counterpart European Application No. 14160614.5.
Chinese Office Action (and English translation thereof) dated Jun. 14, 2016, issued in counterpart Chinese Application No. 201410108468.2.
Li, "Linear Algebra", Harbin Engineering University Press, pp. 39-41, Apr. 2002.

* cited by examiner

FIG. 7A
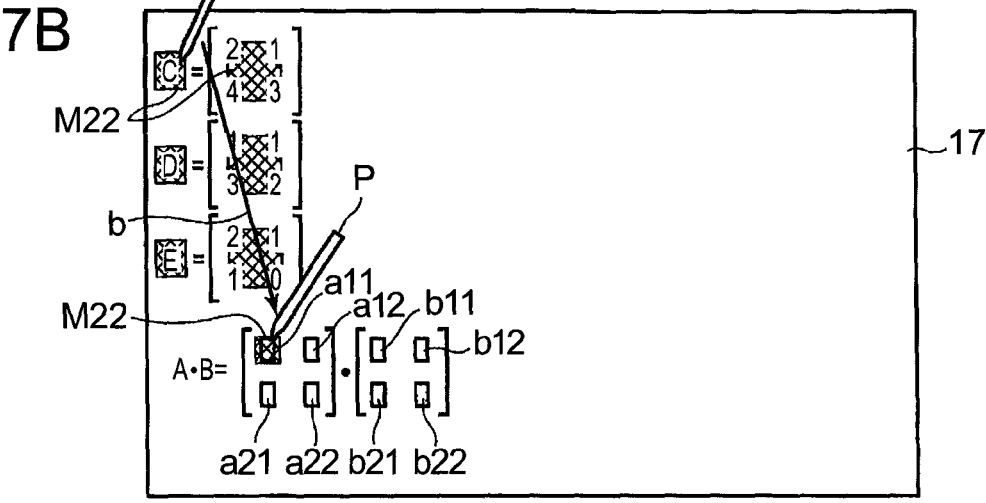
FIG. 7B
FIG. 7C
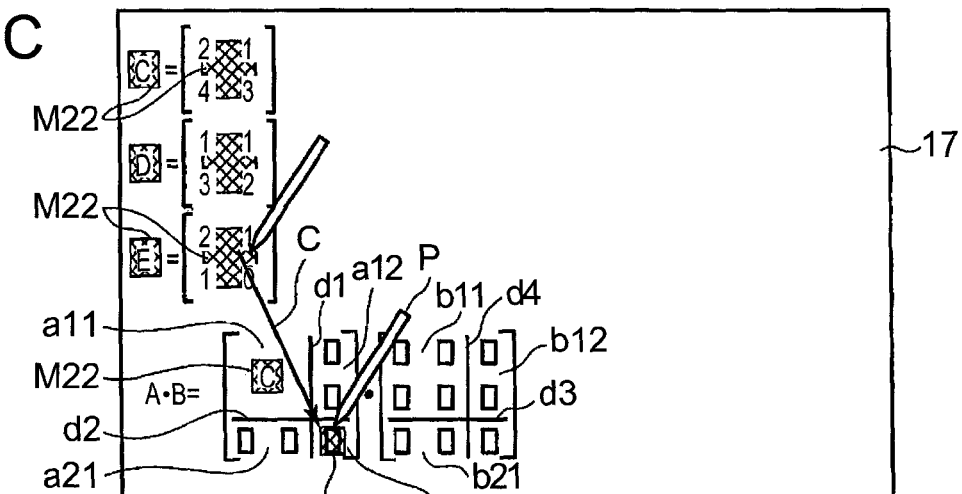
FIG. 7D
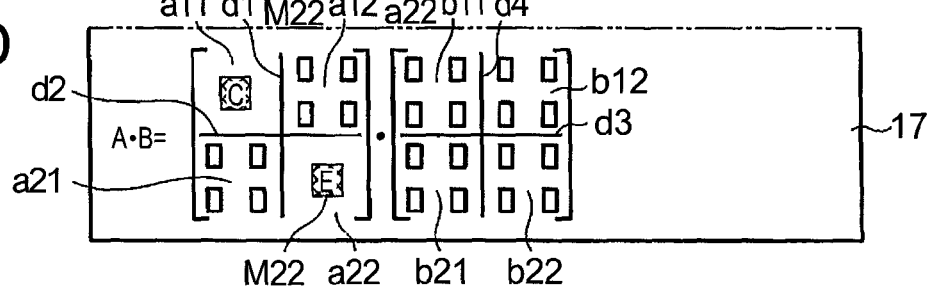

MATRIX CALCULATION APPARATUS, MATRIX CALCULATION METHOD, AND COMPUTER READABLE MEDIUM HAVING MATRIX CALCULATION PROCESS PROGRAM STORED THEREON

CROSS-REFERENCE TO RELATED APPLICATION

This application claims priority from Japanese Patent Application No. 2013-058983, filed on Mar. 21, 2013, the entire contents of which are hereby incorporated by reference.

BACKGROUND

1. Technical Field

The present disclosure relates to a matrix calculation apparatus, a matrix calculation method, and a computer readable medium having a matrix calculation process program stored thereon.

2. Description of the Related Art

Recently, scientific calculators which can display various calculation formulae in a mathematics textbook in the prescribed forms as they are (hereinafter also refer to mathematical formula natural display) have been widespread. A matrix calculation function has been also built in such a scientific calculator which can make mathematical formula natural display.

In a scientific calculator according to the related art, assume that a result of multiplying matrices A and B has been displayed as a matrix of solutions with a matrix calculation formula of the matrices A and B. When a desired one of matrix elements of the displayed solutions is specified in this state, matrix elements in the matrix calculation formula used for calculating the matrix element of the specified solution are identified and displayed. In this manner, there has been conceived a matrix calculation apparatus by which a user can easily learn the combination of a plurality of matrix elements calculated among matrices in the process of calculation of a product of the matrices (for example, see JP-A-05-012215).

In addition, in learning of calculation of large matrices having a large number of elements in each column and each row, there is a technique in which partial matrices (submatrices) the matrices are divided into are replaced by unique matrix symbols (submatrix symbols) so that the large matrices can be simplified equivalently for the sake of efficient calculation thereof.

The matrix calculation function is built in the related-art scientific calculator etc. However, it is not possible to use the related-art scientific calculator to learn a procedure of efficient calculation with a simplified matrix calculation formula which is, for example, generated in combination of submatrices into which large matrices are divided.

SUMMARY

One of illustrative aspects of the present invention is to provide a matrix calculation apparatus, a matrix calculation method and a computer readable medium having a matrix calculation process program stored thereon, which are capable of learning a procedure of efficient calculation using submatrices.

According to one or more illustrative aspects of the present invention, there is provided a matrix calculation apparatus. The apparatus comprises: a matrix calculation formula display controller configured to display a matrix calculation formula on a display unit, wherein the matrix calculation formula comprises a first matrix; a matrix display controller configured to display a second matrix on the display unit; a submatrix receiver configured to input the second matrix into a certain element of the first matrix as a submatrix of the first matrix in response to a user operation; and a matrix size change display controller configured to change a size of the first matrix in accordance with a size of the second matrix and the certain element of the first matrix into which the second matrix is input and then display the matrix calculation formula comprising the first matrix whose size is changed.

According to one or more illustrative aspects of the present invention, there is provided a matrix calculation method. The method comprises: (a) displaying a matrix calculation formula on a display unit, wherein the matrix calculation formula comprises a first matrix; (b) displaying a second matrix on the display unit; (c) inputting the second matrix into a certain element of the first matrix as a submatrix of the first matrix in response to a user operation; and (d) changing a size of the first matrix in accordance with a size of the second matrix and the certain element of the first matrix into which the second matrix is input and then displaying the matrix calculation formula comprising the first matrix whose size is changed.

According to one or more illustrative aspects of the present invention, there is provided a non-transitory computer-readable medium storing a matrix calculation process program for causing a computer to perform predetermined operations. The predetermined operation comprises: (a) displaying a matrix calculation formula on a display unit, wherein the matrix calculation formula comprises a first matrix; (b) displaying a second matrix on the display unit; (c) inputting the second matrix into a certain element of the first matrix as a submatrix of the first matrix in response to a user operation; and (d) changing a size of the first matrix in accordance with a size of the second matrix and the certain element of the first matrix into which the second matrix is input and then displaying the matrix calculation formula comprising the first matrix whose size is changed.

Other aspects and advantages of the present invention will be apparent from the following description, the drawings and the claims.

BRIEF DESCRIPTION OF THE DRAWINGS

FIGS. 7A to 7D are views showing display operation of a process for dividing a matrix calculation formula A·B of multiplication of matrices with 4 rows and 4 columns into submatrices and calculating the matrix calculation formula in accordance with a matrix calculation process of the graph scientific calculator 10;

DETAILED DESCRIPTION OF EXEMPLARY EMBODIMENTS

Exemplary embodiments of the present invention will be described below with reference to the drawings.

Figure 1:
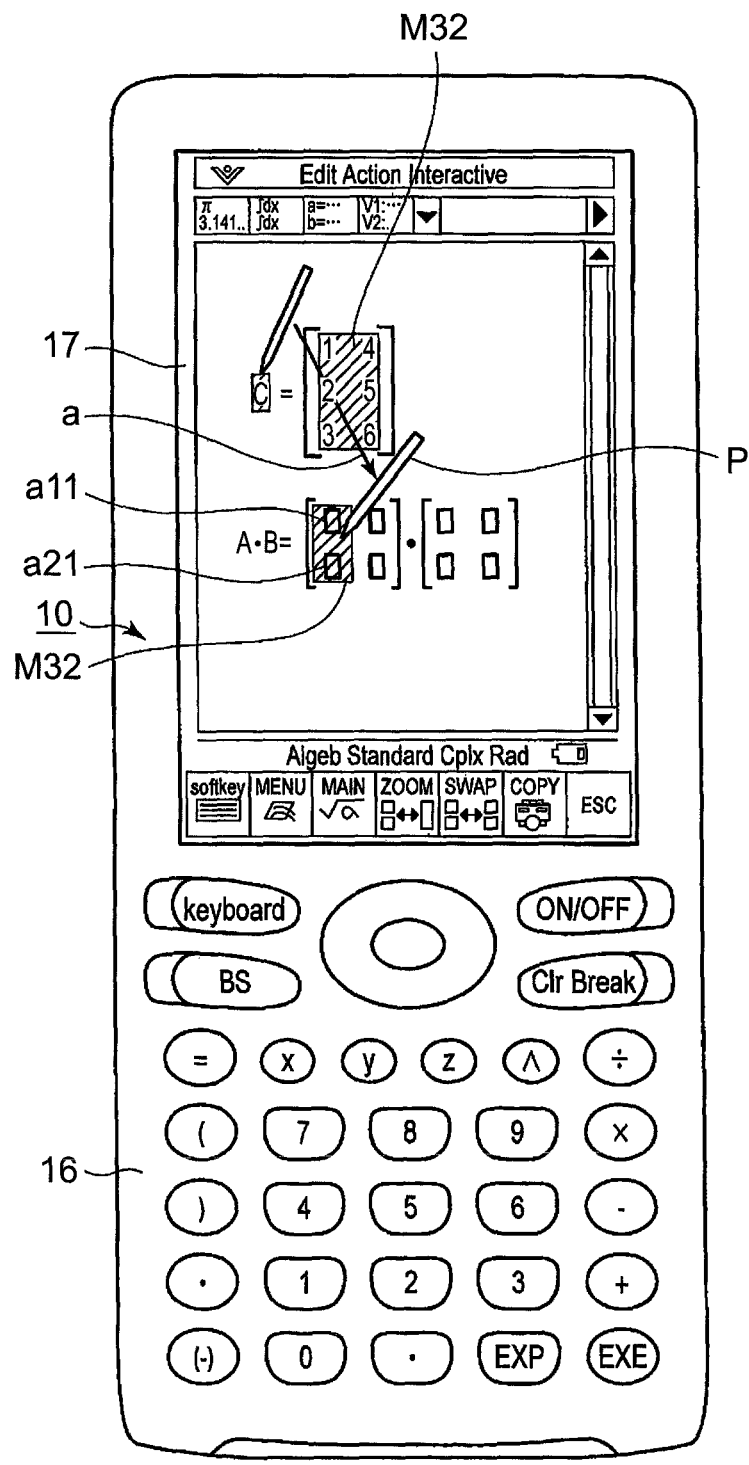
FIG. 1 is a front view showing the external configuration of a graph scientific calculator 10 according to an embodiment.

FIG. 1 is a front view showing the external configuration of a graph scientific calculator 10 according to an embodiment of a matrix calculation apparatus.

This matrix calculation apparatus may be configured as a portable apparatus exclusively used for calculation (the graph scientific calculator 10) which will be described later, or configured as a touch panel type PDA (Person Digital Assistants), a PC (Personal Computer), a cell phone, an electronic book, a portable game machine or the like provided with a matrix calculation function.

A casing of the graph scientific calculator 10 has a size large enough to be held by a user with one hand A key receiver 16 is provided in a lower half region of the front surface of the casing. Numeric keys, operation keys, symbol keys, and various function keys are provided in the key receiver 16. A touch panel type color display unit 17 is provided in an upper half region of the front surface of the casing.

Figure 2:
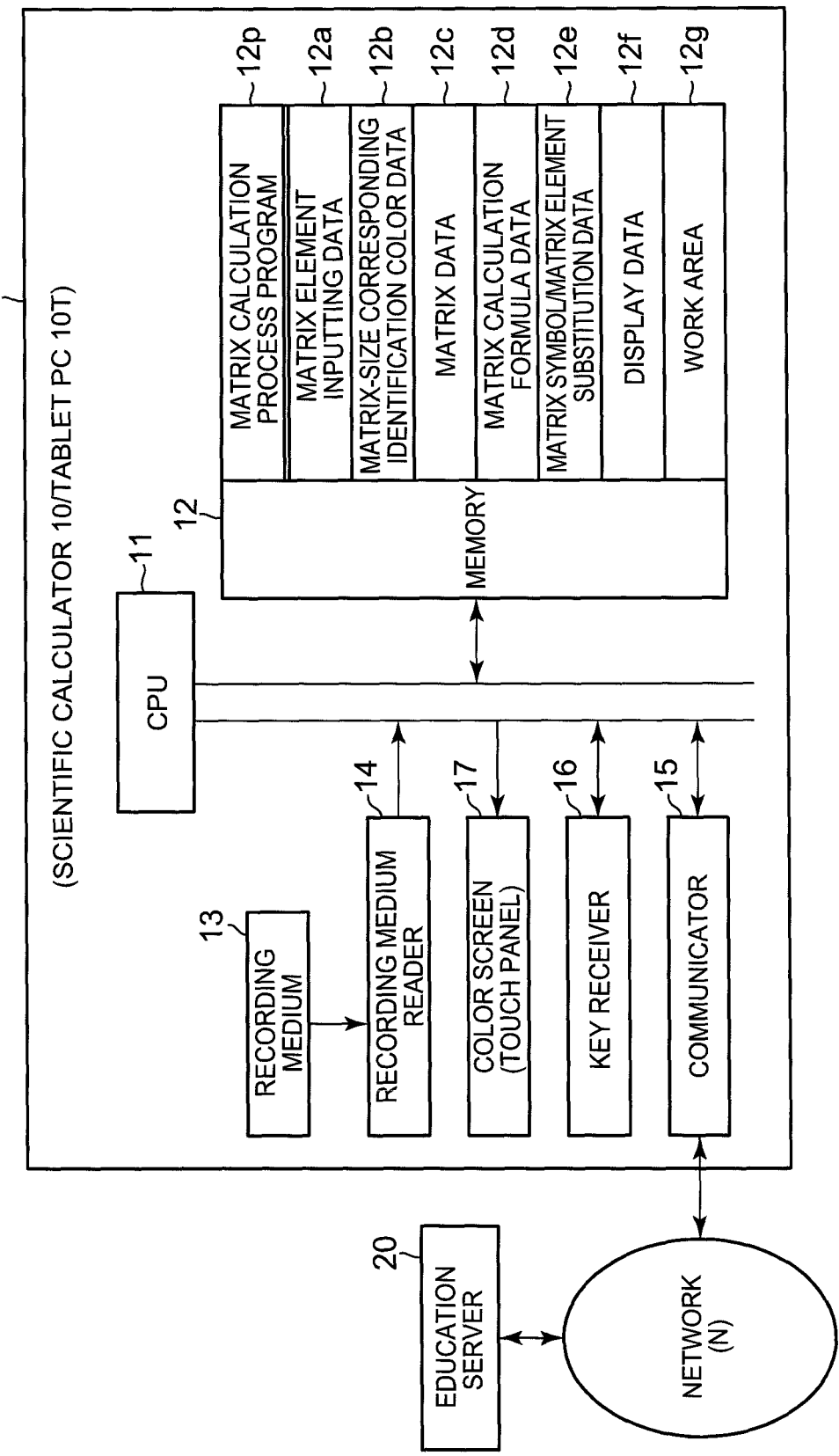
FIG. 2 is a block diagram showing the configuration of an electronic circuit of the graph scientific calculator 10.

FIG. 2 is a block diagram showing the configuration of an electronic circuit of the graph scientific calculator 10.

A CPU 11 serving as a computer is provided in the electronic circuit of the graph scientific calculator 10. The CPU 11 controls operations of respective elements of the circuit using a memory 12 as a working area in accordance with a calculator control program stored in advance in the memory 12, or a calculator control program read from an external storage medium 13 such as a memory card into the memory 12 through a recording medium reader 14 or a calculator control program read from a Web server (an education server in this embodiment) 20 on a communication network N into the memory 12 through a communicator 15.

The calculator control program stored in the memory 12 includes a matrix calculation process program 12p for learning a procedure of efficient calculation of matrices using submatrices which the matrices are divided into, as well as a calculation program for performing various calculation processes, a graph drawing process, a table process, etc. and a communication program for making communication with various external electronic apparatuses through the communicator 15.

The calculator control program is started up in accordance with a key input signal generated from the key receiver 16 in response to an operation of a user, or in accordance with a touch input signal issued from the touch panel type color display unit 17 in response to an operation of the user, or in accordance with a communication signal received from the outside through the communicator 15.

A matrix element inputting data region 12a, a matrix-size corresponding identification color data region 12b, a matrix data region 12c, a matrix calculation formula data region 12d, a matrix symbol/matrix element substitution data region 12e, a display data region 12f, a work area 12g, etc. are allocated as storage areas for various works in the memory 12.

Figure 6A:
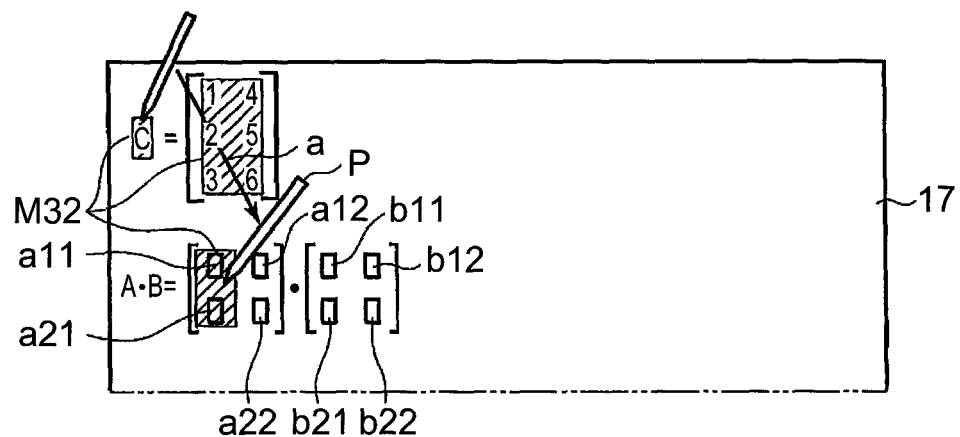
FIGS. 6A and 6B are views showing input and display operations of a matrix calculation formula in accordance with the matrix calculation process of the graph scientific calculator 10.

Fundamental matrix calculation formulae of various matrix calculation forms (a matrix calculation formula A·B of the product of matrices with 2 rows and 2 columns in the embodiment) in which numerical value input positions (matrix positions) (a11, a21, a12, a22, b11, b21, b12 and b22 in the embodiment) of respective elements constituting the matrices are depicted, for example, as shown in FIG. 6A, are stored in the matrix element inputting data region 12a.

Figure 3:
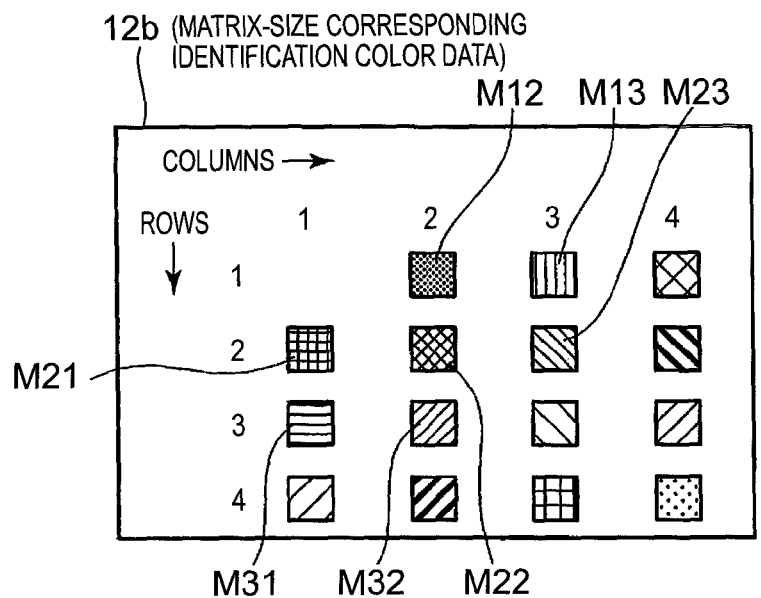
FIG. 3 is a view showing a specific example of identification color data stored in a matrix-size corresponding identification color data region 12b of the graph scientific calculator 10.

FIG. 3 is a view showing a specific example of identification color data stored in the matrix-size corresponding identification color data region 12b of the graph scientific calculator 10.

The matrix-size corresponding identification color data (12b) define identification colors for displaying identification marks Mmn to matrices with m rows and n columns (including matrices replaced by matrix symbols) displayed on the display unit 17 in a matrix calculation process, respectively. The identification marks Mmn have shapes and colors corresponding to the matrix sizes (m×n). For example, the identification marks Mmn are defined as an identification mark M12 (aqua blue) for a matrix with one row and two columns, an identification mark M13 (green) for a matrix with one row and three columns, an identification mark M21 (red) for a matrix with two rows and one column, an identification mark M22 (yellow green) for a matrix with two rows and two columns, an identification mark M23 (yellow) for a matrix with two rows and three columns, an identification mark M31 (rose pink) for a matrix with three rows and one column, an identification mark M32 (light green) for a matrix with three rows and two columns, etc.

In the matrix data region 12c, matrix data of desired matrices inputted by a user, matrices inputted based on learning materials, etc. are stored as matrix data which will be the bases of calculation objects.

Based on one of the fundamental matrix calculation formulae stored in the matrix element inputting data region 12a, a matrix calculation formula may be generated by a user who inputs desired numerical values into matrix elements of each matrix constituting the fundamental matrix calculation formula or a matrix calculation formula may be generated by incorporating desired matrices stored in the matrix data region 12c as submatrices. The matrix calculation formula generated thus is stored in the matrix calculation formula data region 12d.

As for the matrix calculation formula stored in the matrix calculation formula data region 12d, the submatrix symbols of the submatrices incorporated into matrices constituting the calculation formula are stored in association with matrix elements constituting the submatrices in the matrix symbol/matrix element substitution data region 12e. Incidentally, the submatrix symbol of the submatrices are added as unique matrix symbols respectively, for example, in alphabetical order or may be generated by adding suffixes corresponding to matrix positions inside the matrices to the matrix symbols of the matrices to which the submatrices belong.

The display data region 12f has a color bit map data storage region corresponding to a display screen region of the touch panel type color display unit 17. Display screen data generated in accordance with any program in execution is stored in the storage region.

Configuration is made in this manner so that the memory 12, the recording medium reader 14, the communicator 15, the key receiver 16 and the touch panel type color display unit 17 are connected to the CPU 11.

The graph scientific calculator 10 has a function in which desired matrices which are inputted by a user and displayed are incorporated as submatrices into matrix element positions of matrices constituting a fundamental matrix calculation formula read from the matrix element inputting data region 12a so as to generate a desired matrix calculation formula, and the generated matrix calculation formula is displayed; a function in which matrix elements contained in each submatrix in the generated matrix calculation formula are replaced by a submatrix symbol of the submatrix, and a matrix calculation formula generated thus is displayed; a function in which when each submatrix is replaced by its corresponding submatrix symbol, each identity matrix is replaced by an identity matrix symbol "I", each zero matrix is replaced by a zero matrix symbol "0", and a matrix calculation formula generated thus is displayed; a function in which calculation is executed on the generated matrix calculation formula in which each submatrix has been replaced by its corresponding submatrix symbol, the identity matrix symbol "I" or the zero matrix symbol "0"; a function in which after the calculation of the matrix calculation formula is executed, each submatrix symbol constituting a result of the calculation is converted into original matrix elements which have not been replaced by the submatrix symbol yet, and a matrix calculation formula generated thus is displayed; and a function in which an identification mark Mmn having a shape and a color corresponding to a matrix size (m×n) of each matrix (including each matrix replaced by its corresponding matrix symbol) displayed in accordance with the series of matrix calculation processes is added to the matrix, and a matrix calculation formula generated thus is displayed.

In the graph scientific calculator 10 configured thus, the CPU 11 controls operation of each element of the circuit in accordance with commands described in the calculator control program (12p). Due to the cooperation between the software and the hardware, the graph scientific calculator 10 operates to implement the function of generating, calculating and displaying a matrix calculation formula using submatrices as will be described in the following operation description.

Incidentally, description has been made in the case where the embodiment of the matrix calculation apparatus is implemented by the graph scientific calculator 10. However, it is a matter of course that the embodiment of the matrix calculation apparatus may be implemented, for example, by a tablet PC 10T as shown in FIG. 4, as long as inputting and display operation in accordance with respective processes of the matrix calculation process program 12p can be performed on the touch panel type color display unit 17.

Figure 4:
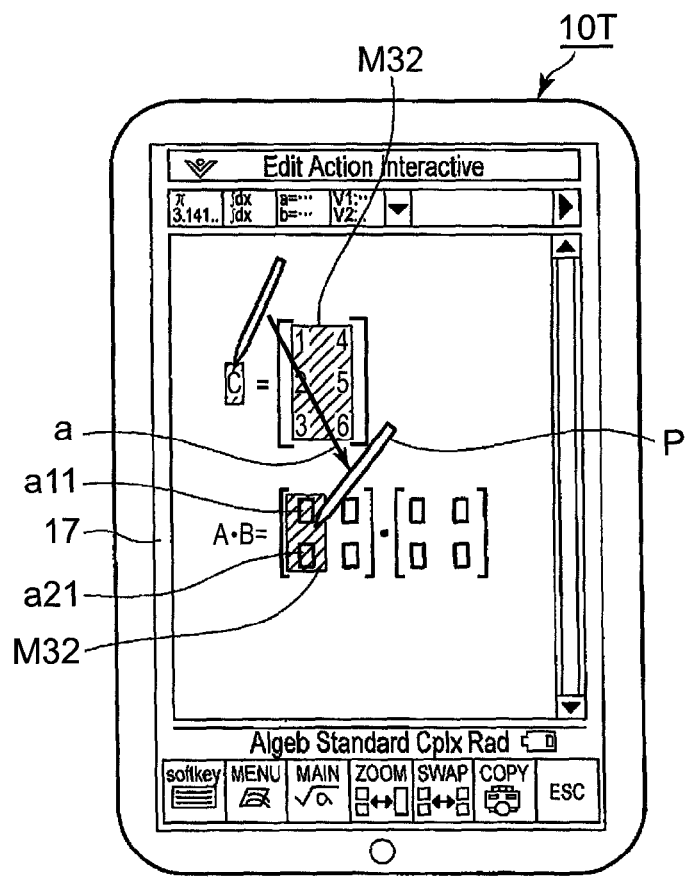
FIG. 4 is a front view showing the external configuration of a tablet PC 10T according to another embodiment of the matrix calculation apparatus.

FIG. 4 is a front view showing the external configuration of the tablet PC 10T according to another embodiment of the matrix calculation apparatus.

The tablet PC 10T in FIG. 4 shows display operation corresponding to a matrix calculation process when a matrix C with three rows and two columns inputted by a user is dragged and dropped to be inputted as a submatrix into element input positions a11 and a21 of a matrix A of a fundamental matrix calculation formula A·B, which is selectively read from the matrix element inputting data region 12a and displayed on the touch panel type color display unit 17.

Next, operation of the graph scientific calculator 10 which is configured as described above and provided with the function of generating, calculating and displaying a matrix calculation formula using submatrices will be described.

Figure 5A:
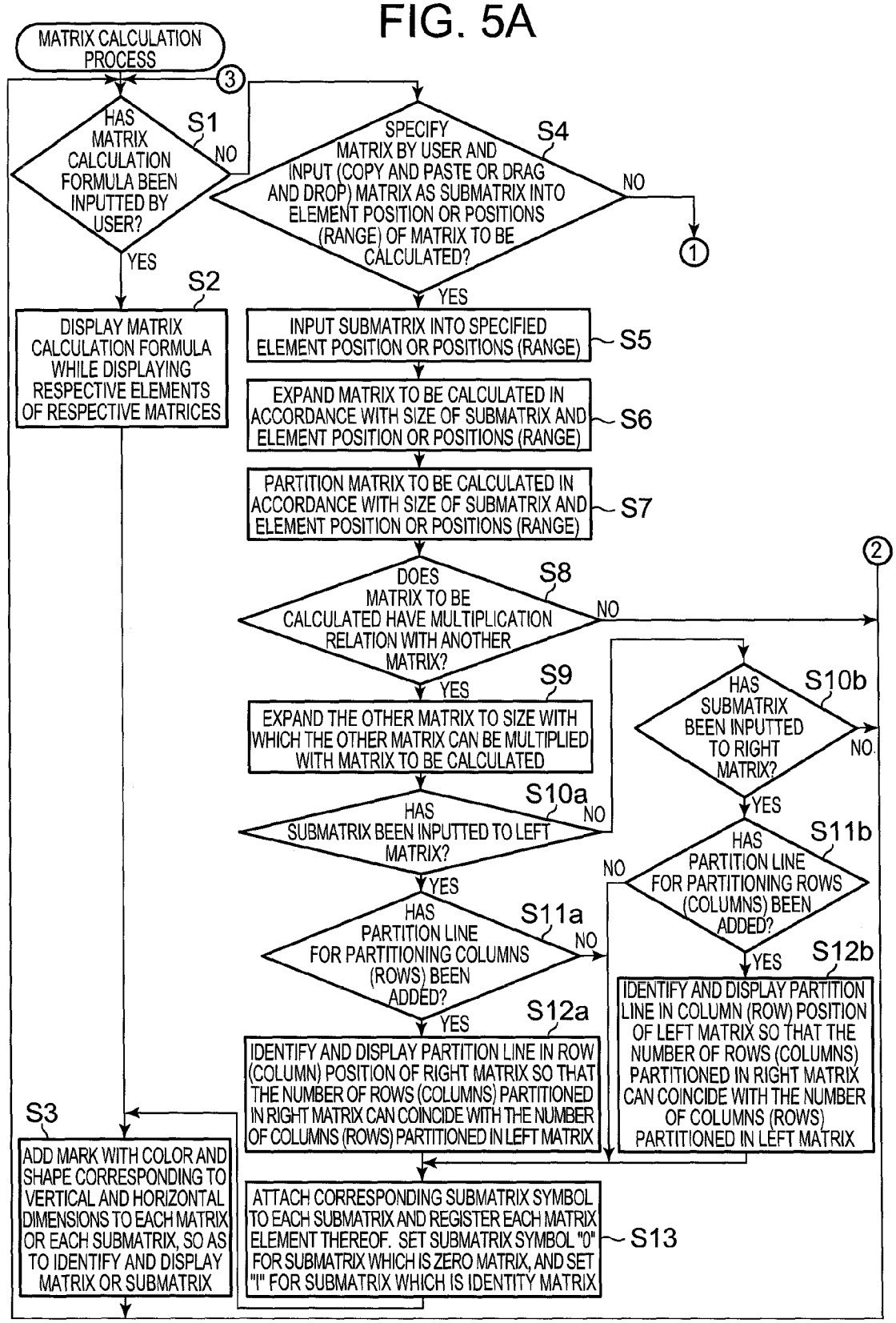
FIG. 5A is a flow chart showing a matrix calculation process performed by the graph scientific calculator 10.

FIG. 5A is a flow chart showing a matrix calculation process performed by the graph scientific calculator 10.

Figure 5B:
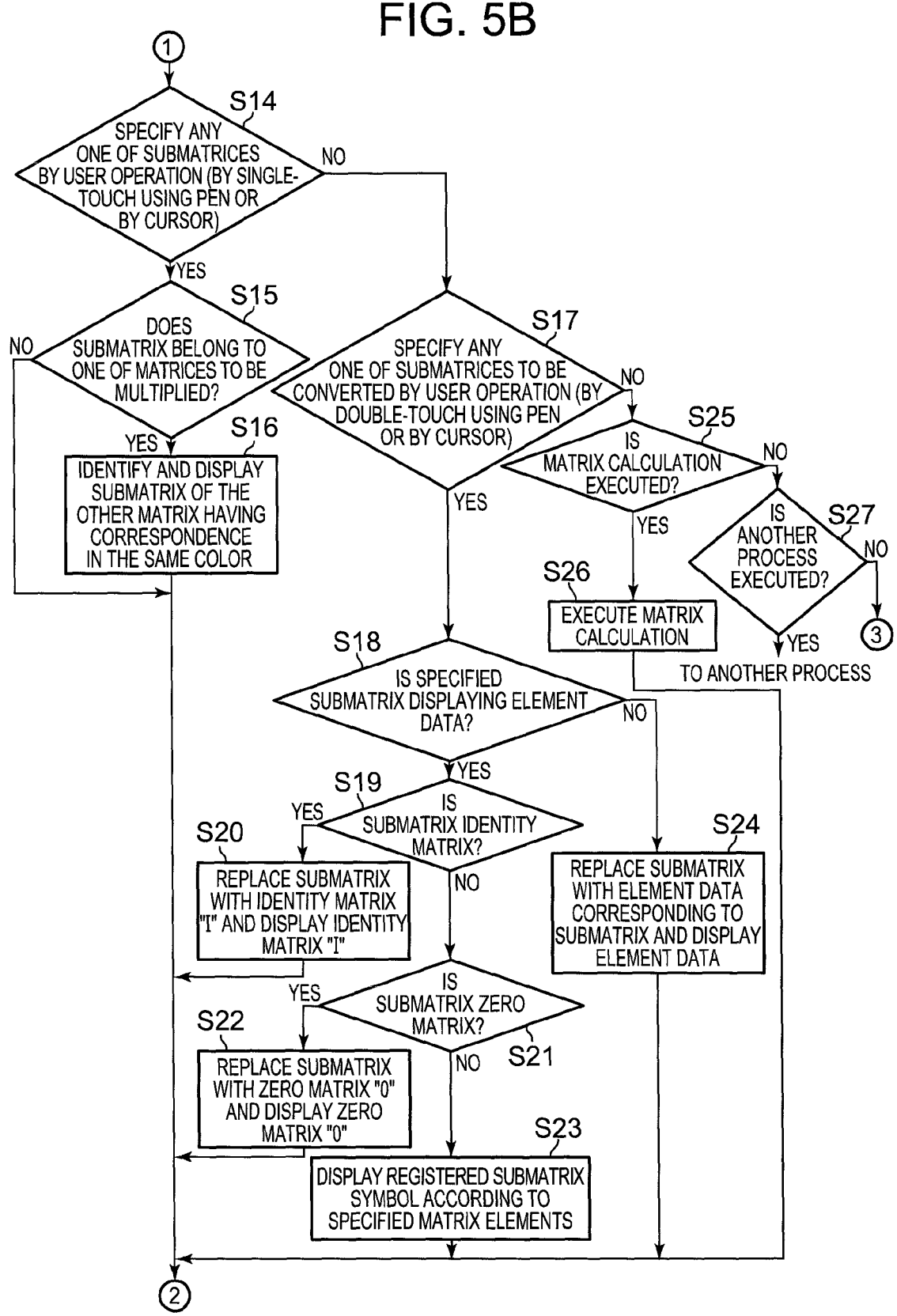
FIG. 5B is a flow chart showing the matrix calculation process performed by the graph scientific calculator 10.

FIG. 5B is a flow chart showing the matrix calculation process performed by the graph scientific calculator 10.

Figure 6B:
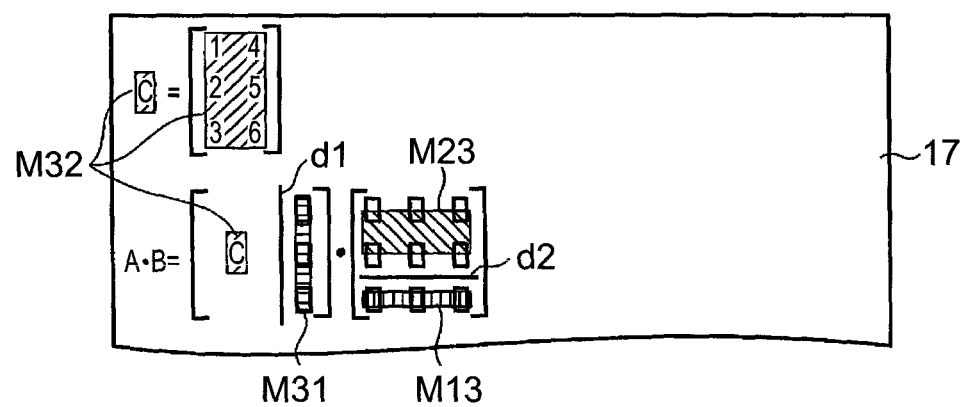

FIGS. 6A and 6B are views showing input and display operations of a matrix calculation formula in accordance with the matrix calculation process of the graph scientific calculator 10.

In order to calculate the product of matrices, for example, the matrix C with three rows and two columns inputted by keys or handwriting (character recognition) is displayed on the touch panel type color display unit 17 as shown in FIG. 6A (Steps S1 (Yes) and S2). Then, data of the inputted matrix C are stored in the matrix data region 12c and an identification mark M32 (light green) for three rows and two columns is added to the matrix C and displayed (Step S3).

For example, a fundamental matrix calculation formula A·B for calculating the product of square matrices has been selectively read from fundamental matrix calculation formulae of a plurality of kinds of matrix calculation forms stored in the matrix element inputting data region 12a. In the state where the fundamental matrix calculation formula A·B is displayed, the inputted matrix C specified by a pen P and dragged and dropped as shown by an arrow a is inputted as a submatrix into element input positions (range) a11 and a21 in a matrix A of the fundamental matrix calculation formula A·B (Step S4 (Yes)).

Then, submatrix symbol "C" is inputted and displayed as a submatrix in the element input positions (range) a11 and a21 in the matrix A of the fundamental matrix calculation formula A·B as shown in FIG. 6B (Step S5), and the matrix A is displayed so that the size thereof is expanded as a matrix with three rows and three columns in accordance with the size (three rows and two columns) of the inputted submatrix C and the element input positions (range) a11 and a21 (Step S6).

A column partition line d1 for partitioning the inputted submatrix C with three rows and two columns is added to the expanded matrix A with three rows and three columns so as to identify and display the submatrix C (Step S7).

When it is determined that the matrix A in which the submatrix C has been inputted and the column partition line d1 has been displayed has a multiplication relation with another matrix B (Step S8 (Yes)), the matrix B which is an object to be multiplied is displayed so that the size thereof is expanded as a matrix with three rows and three columns which can be multiplied by the matrix A (Step S9).

Then, it is determined whether the submatrix C has been inputted to the left matrix A or has been inputted to the right matrix B in the matrix calculation formula A·B having the multiplication relation (Step S10a or S10b). Here, when it is determined that the submatrix C has been inputted to the left matrix A (Step 10a (Yes)), it is determined whether any column or row partition line do has been added or not (Step S11a).

When it is determined that the column partition line d1 for partitioning the inputted submatrix C has been added to the left matrix A (Step 11a (Yes)), a row partition line d2 for partitioning the right matrix B into a submatrix corresponding to up to the second row and a submatrix corresponding to the third row is added to the right matrix B based on the definition of the product of matrices in which the number of columns of the left matrix and the number of rows of the right matrix must be equal to each other, so that the submatrices can be identified and displayed (Step S12a). The matrix calculation formula A·B generated thus is stored in the matrix calculation formula data region 12d.

Then, matrix elements (1, 4, 2, 5, 3, 6) of the submatrix C is registered into the matrix symbol/matrix element substitution data region 12e in association with the submatrix symbol "C" of the submatrix C inside the partitioned matrix A partitioned in response to the submatrix inputted thereto. On this occasion, the submatrix is set and registered as a matrix symbol (zero matrix symbol) "0" when the submatrix is a zero matrix, and the submatrix is set and registered as a matrix symbol (identity matrix symbol) "I" when the submatrix is an identity matrix (Step S13).

In the matrix calculation formula A·B, an identification mark M31 (rose pink) for a matrix with three rows and one column is added to a submatrix corresponding to the rightmost column of the partitioned matrix A partitioned by the column partition line d1, and the submatrix added to the identification mark M31 is displayed. An identification mark M23 (yellow) for a matrix with two rows and three columns is added to a submatrix corresponding to the upper two rows of the partitioned matrix B partitioned by the row partition line d2, and the submatrix added to the identification mark M23 is displayed. An identification mark M13 (green) for a matrix with one row and three columns is added to a submatrix corresponding to the lowest row of the partitioned matrix B partitioned by the row partition line d2, and the submatrix added to the identification mark M13 is displayed (Step S3).

Then, desired matrix data are inputted as a submatrix into each element input position (range) specified in the matrix calculation formula A·B in the same manner as described above. Thus, a desired matrix calculation formula A·B simplified in combination with the submatrices inputted thus is generated and displayed.

FIGS. 7A to 7D are views showing display operation in a process of dividing a matrix calculation formula A·B of multiplication of matrices with 4 rows and 4 columns into submatrices and calculating the matrix calculation formula A·B in accordance with a matrix calculation process of the graph scientific calculator 10.

Figure 8A:
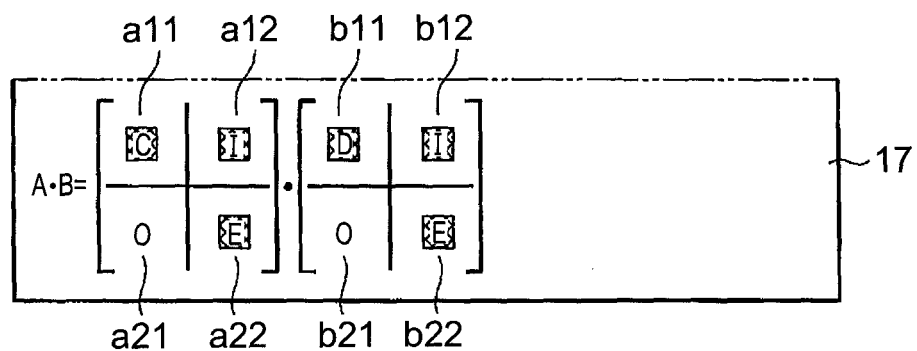
FIGS. 8A to 8C are views showing display operation of the process for dividing a matrix calculation formula A·B of multiplication of matrices with 4 rows and 4 columns into submatrices and calculating the matrix calculation formula in accordance with the matrix calculation process of the graph scientific calculator 10.
Figure 8B:
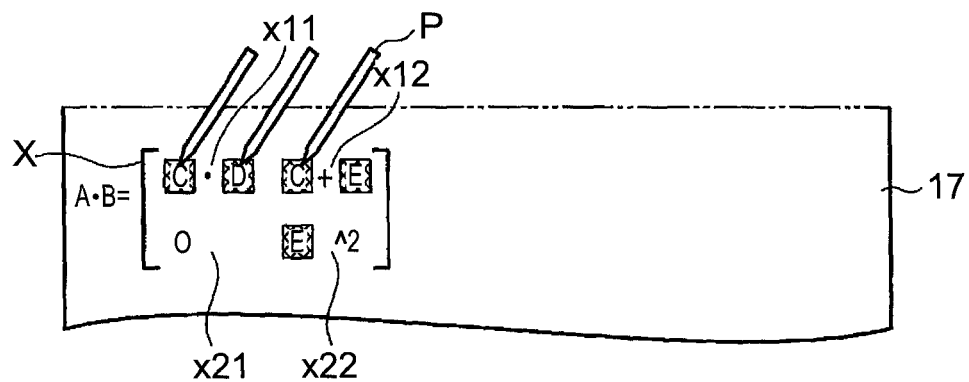
Figure 8C:
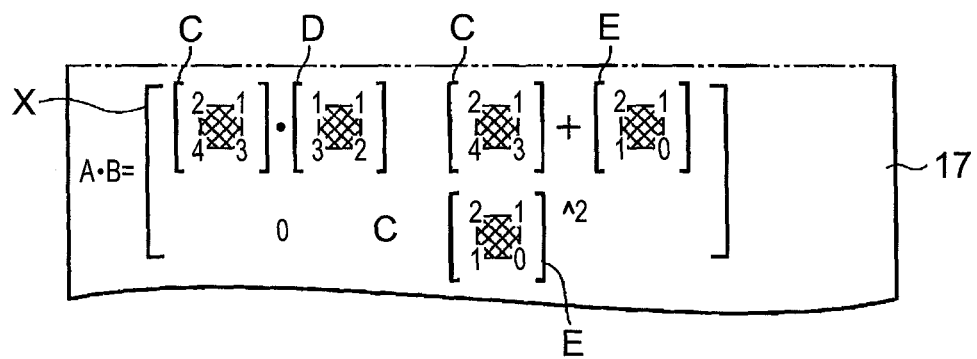

FIGS. 8A to 8C are views showing display operation in the process of dividing the matrix calculation formula A·B of multiplication of matrices with 4 rows and 4 columns into submatrices and calculating the matrix calculation formula A·B in accordance with the matrix calculation process of the graph scientific calculator 10.

When the matrix calculation formula A·B of multiplication of matrices with four rows and four columns is given as a question, for example, as shown in FIG. 7A, a user (learner) recognizes the fact that a submatrix with two rows and two columns in the upper right section of each of the matrix A and the matrix B is an identity matrix and the fact that a submatrix with two rows and two columns in the lower left section of each of the matrix A and the matrix B is a zero matrix. The user learns a procedure of efficient calculation using submatrices as follows.

First, of the matrix calculation formula A·B of multiplication of matrices with four rows and four columns shown in FIG. 7A, submatrices C, D and E except the identity matrix in the upper right section of each matrix and the zero matrix in the lower left section of the same are inputted and displayed as a matrix C, a matrix D and a matrix E on the touch panel type color display unit 17 as shown in FIG. 7B (Steps S1 (Yes) and S2). Then, the inputted data of the matrix C, the matrix D and the matrix E are stored in the matrix data region 12c and displayed so that an identification mark M22 (yellow green) for a matrix with two rows and two columns is added to each of the matrices C, D and E (Step S3).

In order to calculate the matrix calculation formula A·B of multiplication of matrices with four rows and four columns given as the question (see FIG. 7A), a fundamental matrix calculation formula A·B of the product of square matrices is selectively read from fundamental matrix calculation formulae of matrix calculation forms stored in the matrix element inputting data region 12a as shown in FIG. 7B. In the state where the fundamental matrix calculation formula A·B has been displayed, the inputted matrix C is first specified by the pen P and dragged and dropped as shown by an arrow b so that the inputted matrix C is inputted as a submatrix into an element input position a11 in the matrix A of the fundamental matrix calculation formula A·B (Step S4 (Yes)).

Then, submatrix symbol "C" is inputted as a submatrix in the element input position a11 of the matrix A of the fundamental matrix calculation formula A·B and displayed as shown in FIG. 7C (Step S5). In accordance with the size (two rows and two columns) of the inputted submatrix C and the element input position a11, the matrix A is displayed so that the size thereof is expanded to a matrix with three rows and three columns (Step S6).

A column partition line d1 and a row partition line d2 for partitioning the inputted submatrix C with two rows and two columns are added to the expanded matrix A with three rows and three columns so that the submatrix C is identified and displayed (Step S7).

When it is determined that the matrix A in which the submatrix C has been inputted and the column partition line d1 and the row partition line d2 have been displayed has a multiplication relation with the other matrix B (Step S8 (Yes)), the matrix B serving as an object to be multiplied is displayed so that the size thereof is expanded to a matrix with three rows and three columns which can be multiplied by the matrix A (Step S9).

Then, it is determined whether the submatrix C has been inputted to the left matrix A or has been inputted to the right matrix B in the matrix calculation formula A·B having the multiplication relation (Step 10a or 10b). When it is determined that the submatrix C has been inputted to the left matrix A (Step 10a (Yes)), it is determined whether any column or row partition line do has been added or not (Step 11a).

When it is determined that the column partition line d1 and the row partition line d2 for partitioning the inputted submatrix C have been added to the left matrix A (Step 11a (Yes)), a row partition line d3 and a column partition line d4 for partitioning the right matrix B into a submatrix corresponding to the second row and the second column are added to the right matrix B based on the definition of the product of matrices in which the number of columns in the left matrix must be equal to the number of rows in the right matrix, so that the submatrices can be identified and displayed (Step S12a). The matrix calculation formula A·B generated thus is stored in the matrix calculation formula data region 12d.

Then, matrix elements (2, 1, 4, 3) of the submatrix C associated with the submatrix symbol "C" of the submatrix C in the partitioned matrix A partitioned in response to the submatrix C inputted thereto is registered into the matrix symbol/matrix element substitution data region 12e (Step S13).

Successively, in the same manner as described above, the matrix E which has been inputted based on the question is specified by the pen P and dragged and dropped as shown by an arrow c so as to be inputted as a submatrix into an element input position a22 in the matrix A of the matrix calculation formula A·B to which the submatrix C has been inputted (Step 4 (Yes)).

Then, as shown in FIG. 7D, the submatrix symbol "E" is inputted and displayed in the element input position a22 in the matrix A of the matrix calculation formula A·B to which the submatrix E has been inputted (Step S5) and the matrix A is displayed so that the size thereof is further expanded to a matrix with four rows and four columns in accordance with the size (2 rows and 2 columns) of the inputted submatrix E and the element input position a22 (Step S6).

The column partition line d1 and the row partition line d2 for partitioning the inputted submatrix E with two rows and two columns are extended directly in the expanded matrix A with four rows and four columns, which is an object to be calculated, so that the submatrix E can be identified and displayed (Step S7).

When it is determined that the matrix A in which the submatrix E has been inputted and the column partition line d1 and the row partition line d2 have been extended and displayed has a multiplication relation with the other matrix B (Step S8 (Yes)), the matrix B which is an object to be multiplied is displayed so that the size thereof is also expanded to a matrix to be calculated, that is, a matrix with four rows and four columns which can be multiplied by the matrix A (Step S9).

Here, when the size of the matrix B has been expanded to a matrix to be calculated, that is, a matrix with four rows and four columns which can be multiplied by the matrix A, the row partition line d3 and the column partition line d4 are also extended and displayed according to the expansion of the size of the matrix B.

Then, it is determined whether the submatrix E has been inputted to the left matrix A or has been inputted to the right matrix B in the matrix calculation formula A·B having the multiplication relation (Step 10a or S10b). When it is determined that the submatrix E has been inputted to the left matrix A (Step 10a (Yes)), it is determined whether any column or row partition line do has been added or not (Step S11a).

When it is determined that the column partition line d1 and the row partition line d2 for partitioning the submatrix E inputted this time are not added to the left matrix A this time but were added when the submatrix C was inputted (Step S11a (No)), matrix elements (2, 1, 1, 0) of the submatrix E are registered in the matrix symbol/matrix element substitution data region 12e in association with the submatrix symbol "E" of the submatrix E of the partitioned matrix A to which the submatrix E has been inputted this time (Step S13).

Successively, in the same manner as described above, the matrix D which has been inputted based on the aforementioned question is specified by the pen P and dragged and dropped so as to be inputted as a submatrix to an element input position (range) b11 in the right matrix B of the matrix calculation formula A·B (Step S4 (Yes)).

Then, the submatrix symbol "D" is inputted as a submatrix to the element input position (range) b11 in the right matrix B of the matrix calculation formula A·B and displayed (see FIG. 8A) (Step S5). The matrix B is displayed so that the size thereof is expanded to a matrix with four rows and four columns in accordance with the size (2 rows and 2 columns) of the inputted submatrix D and the element input position b11 (Step S6).

When the submatrices C and E are inputted to the matrix A, an expansion process is not actually performed here since the matrix B is also expanded.

The row partition line d3 and the column partition line d4 for partitioning the inputted submatrix D with two rows and two columns are displayed as they are in the expanded matrix B with four rows and four columns so as to identify the submatrix D (Step S7).

When it is determined that the matrix B in which the submatrix D has been inputted this time and the row partition line d3 and the column partition line d4 have been displayed has a multiplication relation with the other matrix A (Step S8 (Yes)), the other matrix A serving as an object to be multiplied is displayed so that the size thereof is expanded to a matrix to be calculated, that is, a matrix with four rows and four columns, which can be multiplied by the matrix B (Step S9).

When the submatrices C and E are inputted to the matrix A which is an object to be calculated, an expansion process is not actually performed here since the matrix size of the matrix B is expanded to a matrix with four rows and four columns.

Then, it is determined whether the submatrix D has been inputted to the left matrix A or has been inputted to the right matrix B in the matrix calculation formula A·B having the multiplication relation (Step S10a or S10b). When it is determined that the submatrix D has been inputted to the right matrix B (Step S10b (Yes)), it is determined whether any row or column partition line do has been added or not (Step S11b).

Since it is determined that the row partition line d3 and the column partition line d4 for partitioning the submatrix D inputted this time are not added to the right matrix B this time but were added when the submatrix C was inputted to the left matrix A (Step S11b (No)), matrix elements (1, 1, 3, 2) of the submatrix D are registered in the matrix symbol/matrix element substitution data region 12e in association with the submatrix symbol "D" of the submatrix D of the partitioned matrix B partitioned in response to the submatrix D inputted thereto this time (Step S13).

Successively, when the matrix E is dragged and dropped so as to be inputted as a submatrix to an element input position (range) b22 of the right matrix B, which is an object to be multiplied, in the same manner as described above, the submatrix symbol "E" inputted this time is displayed in the element input position (range) b22 of the right matrix B in accordance with the same process as described above (Steps S4 to S10b (Yes)) as shown in FIG. 8A.

The matrix elements (2, 1, 1, 0) of the submatrix E are registered into the matrix symbol/matrix element substitution data region 12e in association with the submatrix symbol "E" of the submatrix E in the partitioned matrix B partitioned in response to the submatrix E inputted thereto this time (Step S13).

As shown in FIG. 8A, for example, the submatrix symbol "I" of the identity matrix and the submatrix symbol "0" of the zero matrix are selected from a function menu in accordance with the positions of the identity matrix and the zero matrix recognized by the user (learner) in the matrix calculation formula A·B of the question (see FIG. 7A). Thus, the submatrix symbol "I" of the identity matrix is inputted to and displayed in each of an element input position a12 of the left matrix A and an element input position b12 of the right matrix B, and the submatrix symbol "0" of the zero matrix is inputted to and displayed in each of an element input position a21 of the left matrix A and an element input position b21 of the right matrix B.

In this manner, as for the matrix calculation formula A·B (see FIG. 7A) with matrices of four rows and four columns given as the question, the user (learner) can replace the submatrices C, D and E constituting the matrix calculation formula A·B by the submatrix symbols "C", "D" and "E" corresponding to the submatrices respectively, and replace each identity matrix and each zero matrix by the identity matrix symbol "I" and the zero submatrix symbol "0" so that the calculation formula A·B can be displayed as a matrix calculation formula A·B simplified using the submatrices.

When an instruction to execute matrix calculation is issued in response to operation on an "EXE" key of the key receiver 16 (Step S25 (Yes)), multiplication of the simplified matrix calculation formula A·B is executed as it is and a multiplication result X thereof is displayed as shown in FIG. 8B (Step S26).

In the multiplication result X of the simplified matrix calculation formula A·B, when each of the submatrix symbols "C", "D" and "E" corresponding to constituent elements x11 to x22 of the multiplication result is double-touched by the pen P or double-specified by a cursor sequentially (Step S17 (Yes)), it is determined that the specified submatrix symbol "C", "D" or "E" has not been displayed using its matrix elements yet (Step S18 (No)).

Then, each of the submatrix symbols "C", "D" and "E" corresponding to the constituent elements x11 to x22 of the multiplication result X of the matrix calculation formula A·B is replaced by its corresponding matrix elements registered in the matrix symbol/matrix element substitution data region 12e in the step S13, and the matrix elements are displayed as shown in FIG. 8C (Step S24).

In this manner, the user (learner) can learn a procedure of efficient calculation using submatrices when the matrices are calculated.

When each of the submatrices C and D of the left partitioned matrix A and the submatrices C and E of the right partitioned matrix B is double-touched by the pen P or double-specified by the cursor sequentially in the state in which the constituent elements x11 to x22 of the matrix calculation formula A·B have been replaced by their corresponding matrix elements and the matrix elements are displayed as shown in FIG. 8C (Step S17 (Yes)), it is determined in the same manner as described above that the submatrix C, D or E has been displayed using its matrix elements (Step S18 (Yes)).

When it is then determined that each of the specified submatrices C, D and E of the matrix calculation formula A·B is neither the identity matrix (Step S19 (No)) nor the zero matrix (Step S21 (No)), the submatrix C, D or E is replaced by the submatrix symbol "C", "D" or "E" registered in the matrix symbol/matrix element substitution data region 12e in association with the specified submatrix C, D or E, and the submatrix symbol "C", "D" or "E" is displayed as shown in FIG. 8B (Step S23).

When it is determined in the same manner as described above that the submatrix specified in the matrix calculation formula A·B has been displayed using its matrix elements (Step S18 (Yes)) and it is determined that the specified submatrix is an identity matrix (Step S19 (Yes)), the matrix element is replaced by the submatrix symbol (identity symbol) "I", and the submatrix symbol "I" is displayed (Step S20).

In addition, when it is determined that the submatrix specified in the matrix calculation formula A·B is a zero matrix (Step S21 (Yes)), matrix elements of the submatrix are replaced by the submatrix symbol (zero matrix symbol) "0" and the submatrix symbol "0" is displayed (Step S22).

In this manner, the user (learner) may replace each submatrix of the generated matrix calculation formula A·B (see FIG. 8C) by a submatrix symbol corresponding to the submatrix and replace each identity matrix and each zero matrix by the identity matrix symbol "I" and the zero matrix symbol "0" respectively so that the original simplified matrix calculation formula A·B (see FIG. 8B) restored thus can be displayed.

In addition, when the regions of the submatrices C and 0 in the left partitioned matrix A are single-touched by the pen P or single-specified by the cursor in the matrix calculation formula A·B partitioned by the submatrices as shown in FIG. 8A (Step S14 (Yes)), it is determined that the specified partitioned matrix A is one of the matrices to be multiplied by each other (Step S15 (Yes)) and the regions of the submatrices D and I of the partitioned matrix B which correspond to the specified regions of the submatrices C and 0 of the partitioned matrix A when the matrices A and B are combined for multiplication are identified and displayed in the same display color (for example, yellow) as the regions of the submatrices C and 0 (Step S16).

Further, when the regions of the submatrices I and E in the left partitioned matrix A are single-touched by the pen P or specified by the cursor (Step S14 (Yes)), it is determined in the same manner as described above that the specified partitioned matrix A is one of the matrices to be multiplied by each other (Step S15 (Yes)) and the regions of the submatrices 0 and E of the partitioned matrix B which correspond to the specified regions of the submatrices I and E of the partitioned matrix A when the matrices A and B are combined for multiplication are identified and displayed in the same display color (for example, blue) as the regions of the submatrices I and E (Step S16).

In this manner, the user (learner) can easily and clearly learn how to combine each submatrix of one partitioned matrix A with each submatrix of the other partitioned matrix B in a generated matrix calculation formula A·B to perform multiplication.

Figure 9A:
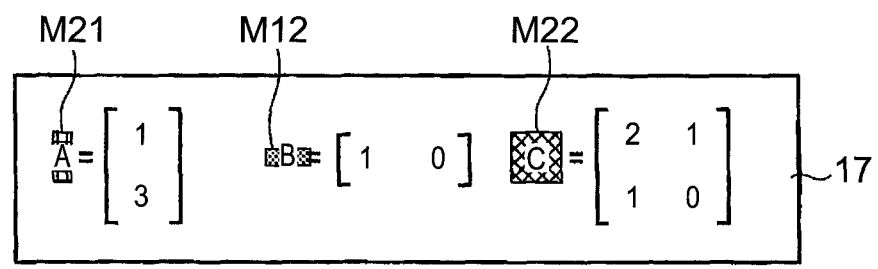
FIGS. 9A to 9C are views showing operation of identifying and displaying various matrix calculation formulae in accordance with a matrix calculation process of the graph scientific calculator 10.
Figure 9B:
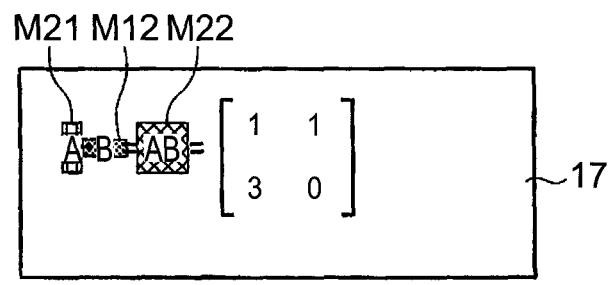
Figure 9C:
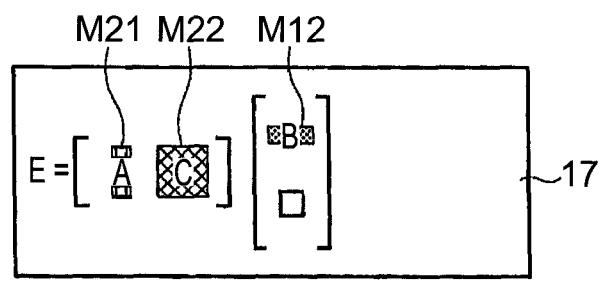

FIGS. 9A to 9C are views showing operation of identifying and displaying various matrix calculation formulae in accordance with a matrix calculation process of the graph scientific calculator 10.

When a matrix A with two rows and one column, a matrix B with one row and two columns and a matrix C with two rows and two columns are inputted in accordance with inputting of a matrix calculation formula or calculated and displayed, for example, as shown in FIGS. 9A to 9C (Steps S1 and S2), an identification mark M21 (red) which is vertically long correspondingly to a matrix with two rows and one column is added to the matrix A so as to identify and display the matrix A, an identification mark M12 (aqua blue) which is horizontally long correspondingly to a matrix with one row and two columns is added to the matrix B so as to identify and display the matrix B, and an identification mark M22 (yellow green) which is square correspondingly to a matrix with two rows and two columns is added to the matrix C so as to identify and display the matrix C, based on the matrix-size corresponding identification color data (12b) (Step S3).

Therefore, according to the function of generating, calculating and displaying a matrix calculation formula using submatrices, which is performed by the graph scientific calculator 10 having the aforementioned configuration, a fundamental matrix calculation formula of a desired matrix calculation form in which positions of elements constituting matrices are depicted can be displayed. In addition, when the position of each of elements of the fundamental matrix calculation formula is specified and each of matrices to be calculated is inputted as a submatrix of the fundamental matrix calculation formula in the state in which the matrices to be calculated have been displayed, the inputted submatrix is written as its submatrix symbol in the position of the element so that a simplified matrix calculation formula can be generated and displayed. On this occasion, data of matrix elements constituting each submatrix are registered into the matrix symbol/matrix element substitution data region 12*e* in association with the submatrix symbol of the submatrix. When calculation of a generated matrix calculation formula in which the submatrix symbols have been incorporated is executed, the matrix calculation is executed using the submatrix symbols as they are. After that, each submatrix symbol can be replaced by the registered data of matrix elements constituting the submatrix corresponding thereto, so as to perform the calculation.

Therefore, when matrices are calculated, it is possible to learn a procedure of efficient calculation using submatrices.

In addition, according to the function of generating, calculating and displaying a matrix calculation formula using submatrices, which is performed by the graph scientific calculator 10 having the aforementioned configuration, matrix symbols and corresponding matrices in the matrix calculation formula displayed on the touch panel type color display unit 17 are displayed so that an identification mark Mmn whose color and shape corresponds to the matrix size (m rows and n columns) of each matrix is added to the matrix and the matrix symbol thereof. Accordingly, even in a matrix calculation formula generated by combination of submatrix symbols, the matrix size of each submatrix serving as matrix elements in the matrix calculation formula can be recognized at a glance.

In addition, according to the function of generating, calculating and displaying a matrix calculation formula using submatrices, which is performed by the graph scientific calculator 10 having the aforementioned configuration, when the position of each matrix element contained in the fundamental matrix calculation formula is specified and each of the matrices to be calculated is inputted as a submatrix, the matrix size of the fundamental matrix calculation formula is changed in accordance with the matrix size of the inputted matrix to be calculated. Accordingly, even in a matrix calculation formula generated by combination of submatrix symbols, it is possible to accurately know the matrix size of the matrix calculation formula.

In addition, according to the function of generating, calculating and displaying a matrix calculation formula using submatrices, which is performed by the graph scientific calculator 10 having the aforementioned configuration, when the matrix to be calculated is inputted as a submatrix in the position of matrix elements of one of matrices to be multiplied by each other in the case where the fundamental matrix calculation formula of the desired matrix calculation form is a fundamental matrix calculation formula of a form for calculating the product of matrices, the submatrix is displayed to be partitioned by partition lines in the one of the inputted matrices. In accordance with this, the other matrix of the product is displayed so that partition lines are also added to the position of matrix elements of the other matrix of the product based on the definition of the product of matrices that the number of columns in the left matrix and the number of rows in the right matrix must be equal to each other. Accordingly, it is possible to correctly, easily and simply generate and learn a matrix calculation formula of matrix multiplication using submatrices.

Incidentally, the methods of the respective processes performed by the graph scientific calculator 10 described in the embodiment, that is, the respective methods of the matrix calculation process shown in the flow chart of FIG. 5A, the matrix calculation process shown in the flow chart of FIG. 5B, etc. may be stored and distributed as programs which can be executed by a computer in the external recording medium 13 such as a memory card (a ROM card, a RAM card, etc.), a magnetic disk (a floppy disk, a hard disk, etc.), an optical disk (a CD-ROM, a DVD, etc.), or a semiconductor memory. The computer of an electronic apparatus provided with the touch panel type color display unit 17 reads a program stored in the external storage device 13 into the storage device 12 and operation of the computer is controlled by the read program so that the computer can implement the function of generating, calculating and displaying a matrix calculation formula using submatrices as described in the embodiment and execute the same processes by the aforementioned methods.

In addition, data of the program for implementing the methods may be transmitted in a form of program codes on the network N. When the program data are imported by the communicator 15 into the computer of the electronic apparatus provided with the touch panel type color display unit 17 connected to the network N, the aforementioned function of generating, calculating and displaying a matrix calculation formula using submatrices can be implemented.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A matrix calculation apparatus comprising:
a processor which is configured to:
    display a matrix calculation formula on a display unit, wherein the matrix calculation formula comprises a first matrix;
    display a second matrix on the display unit;
    input the second matrix into a certain element of the first matrix as a submatrix of the first matrix in response to a user operation received by an input device; and
    change a size of the first matrix in accordance with a size of the second matrix and the certain element of the first matrix into which the second matrix is input and then display the matrix calculation formula comprising the first matrix whose size is changed on the display unit,
    wherein the first matrix comprises a left matrix including a plurality of columns and a right matrix including a plurality of rows, and the matrix calculation formula is represented by multiplication of the left matrix and the right matrix, and
    wherein, when the second matrix is input into a certain element of one of the left and right matrices in response to the user operation, the processor is configured to change sizes of both the left and right matrices in accordance with the size of the second matrix and the certain element of the one of the left and right matrices into which the second matrix is input, and then display the matrix calculation formula on the display unit.

2. The apparatus according to claim 1, wherein the processor is further configured to identify and display the second matrix on the display unit in accordance with the size of the second matrix.

3. The apparatus according to claim 1, further comprising:
an input unit comprising a key input unit or a touch panel; and
the display unit,
wherein the processor is configured to input the second matrix in response to the user operation which is inputted to the input unit.

4. A matrix calculation apparatus comprising:
a processor which is configured to:
display a matrix calculation formula on a display unit, wherein the matrix calculation formula comprises a first matrix;
display a second matrix on the display unit;
input the second matrix into a certain element of the first matrix as a submatrix of the first matrix in response to a user operation received by an input device;
change a size of the first matrix in accordance with a size of the second matrix and the certain element of the first matrix into which the second matrix is input; and
display the matrix calculation formula comprising the first matrix whose size is changed on the display unit,
wherein the first matrix comprises a left matrix including a plurality of columns and a right matrix including a plurality of rows, and the matrix calculation formula is represented by multiplication of the left matrix and the right matrix, and
wherein the processor is further configured to:
when the second matrix is input into a certain element of one of the left and right matrices as a submatrix thereof, identify and display on the display unit a partition position of the submatrix of the one of the left and right matrices; and
identify and display on the display unit a partition position of the other of the left and right matrices in accordance with the partition position of the submatrix and definition of matrix multiplication.

5. A computer-implemented matrix calculation method comprising:
displaying a matrix calculation formula on a display unit, wherein the matrix calculation formula comprises a first matrix;
displaying a second matrix on the display unit;
inputting the second matrix into a certain element of the first matrix as a submatrix of the first matrix in response to a user operation received by an input device of the computer; and
changing a size of the first matrix in accordance with a size of the second matrix and the certain element of the first matrix into which the second matrix is input and then displaying the matrix calculation formula comprising the first matrix whose size is changed on the display unit,
wherein the first matrix comprises a left matrix including a plurality of columns and a right matrix including a plurality of rows, and the matrix calculation formula is represented by multiplication of the left matrix and the right matrix, and
wherein the matrix calculation method further comprises, when the second matrix is input into a certain element of one of the left and right matrices in response to the user operation, changing sizes of both the left and right matrices in accordance with the size of the second matrix and the certain element of the one of the left and right matrices into which the second matrix is input, and then displaying the matrix calculation formula on the display unit.

6. A non-transitory computer-readable storage medium having a matrix calculation process program stored thereon for controlling a computer to perform operations comprising:
displaying a matrix calculation formula on a display unit of the computer, wherein the matrix calculation formula comprises a first matrix;
displaying a second matrix on the display unit;
inputting the second matrix into a certain element of the first matrix as a submatrix of the first matrix in response to a user operation received by an input device of the computer; and
changing a size of the first matrix in accordance with a size of the second matrix and the certain element of the first matrix into which the second matrix is input and then displaying the matrix calculation formula comprising the first matrix whose size is changed on the display unit,
wherein the first matrix comprises a left matrix including a plurality of columns and a right matrix including a plurality of rows, and the matrix calculation formula is represented by multiplication of the left matrix and the right matrix, and
wherein the program controls the computer to perform a further operation of, when the second matrix is input into a certain element of one of the left and right matrices in response to the user operation, changing sizes of both the left and right matrices in accordance with the size of the second matrix and the certain element of the one of the left and right matrices into which the second matrix is input, and then displaying the matrix calculation formula on the display unit.

7. A computer-implemented matrix calculation method comprising:
displaying a matrix calculation formula on a display unit of the computer, wherein the matrix calculation formula comprises a first matrix;
displaying a second matrix on the display unit;
inputting the second matrix into a certain element of the first matrix as a submatrix of the first matrix in response to a user operation received by an input device of the computer;
changing a size of the first matrix in accordance with a size of the second matrix and the certain element of the first matrix into which the second matrix is input; and
displaying the matrix calculation formula comprising the first matrix whose size is changed on the display unit,
wherein the first matrix comprises a left matrix including a plurality of columns and a right matrix including a plurality of rows, and the matrix calculation formula is represented by multiplication of the left matrix and the right matrix, and
wherein the method further comprises:
when the second matrix is input into a certain element of one of the left and right matrices as a submatrix thereof, identifying and displaying on the display unit a partition position of the submatrix of the one of the left and right matrices; and identifying and displaying on the display unit a partition position of the other of the left and right matrices in accordance with the partition position of the submatrix and definition of matrix multiplication.

8. A non-transitory computer-readable storage medium having a matrix calculation process program stored thereon for controlling a computer to perform operations comprising:

displaying a matrix calculation formula on a display unit, wherein the matrix calculation formula comprises a first matrix;

displaying a second matrix on the display unit;

inputting the second matrix into a certain element of the first matrix as a submatrix of the first matrix in response to a user operation received by an input device of the computer;

changing a size of the first matrix in accordance with a size of the second matrix and the certain element of the first matrix into which the second matrix is input; and displaying the matrix calculation formula comprising the first matrix whose size is changed on the display unit, wherein the first matrix comprises a left matrix including a plurality of columns and a right matrix including a plurality of rows, and the matrix calculation formula is represented by multiplication of the left matrix and the right matrix, and wherein the program controls the computer to perform further operations comprising:

when the second matrix is input into a certain element of one of the left and right matrices as a submatrix thereof, identifying and displaying on the display unit a partition position of the submatrix of the one of the left and right matrices; and identifying and displaying on the display unit a partition position of the other of the left and right matrices in accordance with the partition position of the submatrix and definition of matrix multiplication.

* * * * *